United States Patent
Christenson et al.

(10) Patent No.: US 9,851,994 B2
(45) Date of Patent: *Dec. 26, 2017

(54) DYNAMICALLY DEPLOYED VIRTUAL MACHINE

(71) Applicant: International Business Machines Corporation, Armonk, NY (US)

(72) Inventors: Thuy Phuong Christenson, Rochester, MN (US); Brian R. Muras, Rochester, MN (US); Christopher J. Schaefer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 209 days.

This patent is subject to a terminal disclaimer.

(21) Appl. No.: 14/504,474

(22) Filed: Oct. 2, 2014

(65) Prior Publication Data

US 2016/0034294 A1    Feb. 4, 2016

Related U.S. Application Data

(63) Continuation of application No. 14/445,292, filed on Jul. 29, 2014, now Pat. No. 9,311,130.

(51) Int. Cl.
    *G06F 9/445*    (2006.01)
    *G06F 9/455*    (2006.01)

(52) U.S. Cl.
    CPC ............ *G06F 9/45558* (2013.01); *G06F 8/60* (2013.01); *G06F 8/63* (2013.01); *G06F 2009/45562* (2013.01); *G06F 2009/45583* (2013.01)

(58) Field of Classification Search
    CPC .................................... G06F 8/60; G06F 8/63
    See application file for complete search history.

(56) References Cited

U.S. PATENT DOCUMENTS

| | | | | |
|---|---|---|---|---|
| 8,151,263 | B1 * | 4/2012 | Venkitachalam | G06F 9/485 711/162 |
| 2009/0300605 | A1 * | 12/2009 | Edwards | G06F 9/5077 718/1 |

(Continued)

OTHER PUBLICATIONS

U.S. Appl. No. 62/041,047, filed Aug. 23, 2014.*

(Continued)

*Primary Examiner* — Lewis A Bullock, Jr.
*Assistant Examiner* — Tina Huynh
(74) *Attorney, Agent, or Firm* — Matthew C. Zehrer

(57) ABSTRACT

A virtual machine data handling system includes a data handling system, a hypervisor, and a dynamically deployed virtual machine. The data handling system includes a plurality of physical computing resources (e.g., a processor and a memory). The hypervisor is implemented by the processor and the memory and deploys virtual machines from a master image. The dynamically deployed virtual machine is initially deployed by the hypervisor as a Linked Clone of the master image. The dynamically deployed virtual machine is subsequently dynamically deployed by the hypervisor copying a plurality of virtual memory segments from the master image until the dynamically deployed virtual machine is an independent Full Clone of the master image. The hypervisor may copy the plurality of virtual memory segments from the master image if at least one of the physical resources is operating below a utilization threshold.

7 Claims, 11 Drawing Sheets

(56) References Cited

U.S. PATENT DOCUMENTS

| | | | |
|---|---|---|---|
| 2011/0126197 A1* | 5/2011 | Larsen | H04L 9/3213 |
| | | | 718/1 |
| 2011/0154331 A1* | 6/2011 | Ciano | G06F 9/45558 |
| | | | 718/1 |
| 2012/0016977 A1* | 1/2012 | Robertson | H04L 63/20 |
| | | | 709/224 |
| 2012/0117563 A1* | 5/2012 | Chang | G06F 9/45558 |
| | | | 718/1 |
| 2012/0278573 A1 | 11/2012 | Colbert et al. | |
| 2013/0212161 A1 | 8/2013 | Ben-Shaul et al. | |
| 2014/0244950 A1* | 8/2014 | Baron | G06F 3/065 |
| | | | 711/162 |
| 2015/0074662 A1* | 3/2015 | Saladi | G06F 17/5022 |
| | | | 718/1 |
| 2015/0178109 A1* | 6/2015 | Li | G06F 9/45558 |
| | | | 718/1 |
| 2015/0378766 A1* | 12/2015 | Beveridge | G06F 9/45558 |
| | | | 718/1 |

OTHER PUBLICATIONS

U.S. Appl. No. 62/018,582, filed Jun. 28, 2014.*
U.S. Appl. No. 62/018,580, filed Jun. 28, 2014.*
"Converting a linked clone virtual machine to a full clone virtual machine," VMware/Knowledge Base: 1026753; Mar. 13, 2014.
Mohammed Raffic, "VMware Memory Management Part 1—Understanding ESXi Host Memory States" dated Apr. 7, 2014 found on-line at, "http://www.vmwarearena.com/esxi-memory-management-part-1-understanding-esxi-host-memory-states/", retrieved Jan. 6, 2017.

* cited by examiner

DYNAMICALLY DEPLOYED VIRTUAL MACHINE

FIELD OF THE INVENTION

Embodiments of the invention generally relate to computer systems and more particularly to virtual machines, logical partitions, etc. created from an image.

DESCRIPTION OF THE RELATED ART

Virtual machines, also referred to as partitions, etc. may be built from master images or templates that contain e.g., a virtual disk containing an operating system, initial configuration and software applications. Virtual machines may be generally created as a Full Clone of the master image or as a Linked Clone of the master image.

To create a Full Clone virtual machine, everything is copied from the master image into the virtual machine disk. Frequently, these virtual disks are multiple gigabytes (e.g., 80 GB) and so deploying a Full Clone virtual machine may take several minutes as the virtual disk is copied from the master image. The coping often takes place over a communications network. The Full Clone virtual disk starts as a complete copy of the master image. The benefit of the Full Clone is that once deployed, the Full Clone virtual machine runs at an optimal speed.

Conversely, the Linked Clone virtual machine copies pages of the master image as they are changed in the Linked Clone virtual machine relative to the master image. Resultantly, the time to deploy a Linked Clone virtual machine can be as fast as a few seconds. The Linked Clone virtual machine disk is initially significantly smaller (e.g., a few Kbytes) relative to the virtual disk of the Full Clone virtual machine. However, as the Linked Clone virtual machine continues to write to the virtual disk, and more differences relative to the master image are created, the virtual disk grows over time. The benefit of the Linked Clone virtual machine is its fast deployment, and the initial smaller virtual disk size. However, Linked Clone virtual machines may be computationally slow in write intensive environments as each write causes new virtual disk segments to be allocated, written, and managed.

SUMMARY

In a first embodiment of the present invention, a virtual machine data handling system includes a data handling system, a hypervisor, and a dynamically deployed virtual machine. The data handling system includes a plurality of physical computing resources, including at least a processor and a memory. The hypervisor is implemented by the processor and the memory and deploys virtual machines from a master image. The dynamically deployed virtual machine is initially deployed by the hypervisor as a Linked Clone of the master image. The dynamically deployed virtual machine is subsequently dynamically deployed by the hypervisor copying a plurality of virtual memory segments from the master image until the dynamically deployed virtual machine is an independent Full Clone of the master image.

In another embodiment of the present invention, a virtual machine dynamic deployment method includes implementing the hypervisor within the data handling system, initially deploying, with the hypervisor, the dynamically deployed virtual machine as a Linked Clone of the master image, and dynamically deploying, with the hypervisor, the dynamically deployed virtual machine by copying a plurality of virtual memory segments from the master image until the dynamically deployed virtual machine is an independent Full Clone of the master image.

In yet another embodiment of the present invention, a computer program product for dynamically deploying a virtual machine includes a computer readable storage medium having program instructions embodied therewith, the program instructions readable to cause the hypervisor to initially deploy the dynamically deployed virtual machine as a Linked Clone of the master image, and dynamically deploy the dynamically deployed virtual machine by copying the plurality of virtual memory segments from the master image until the dynamically deployed virtual machine is an independent Full Clone of the master image.

DETAILED DESCRIPTION

Figure 1:
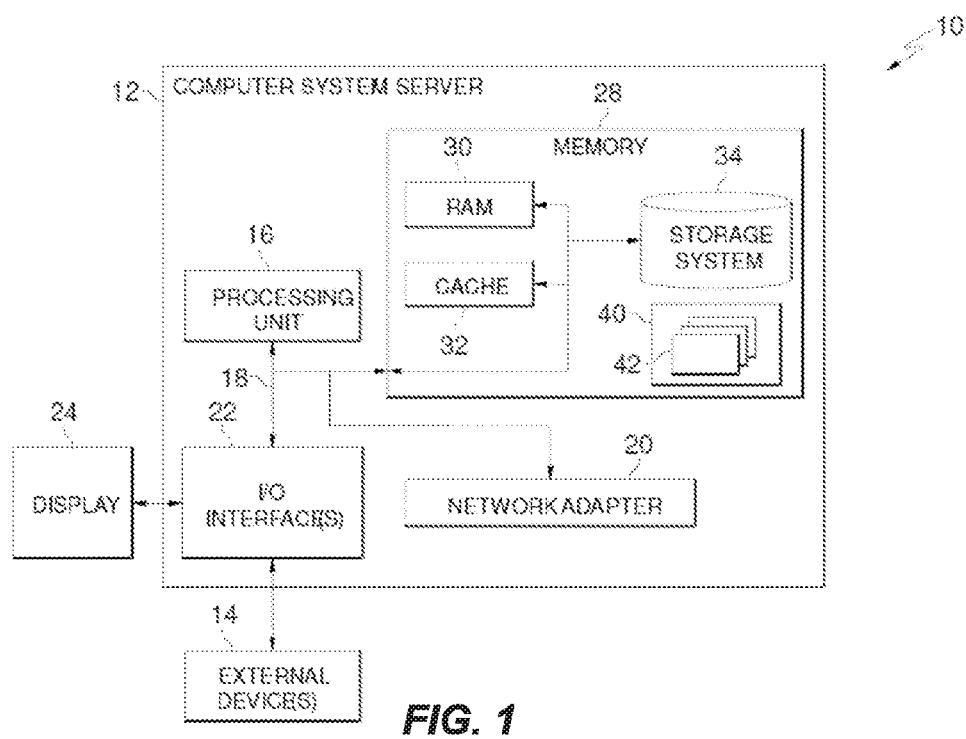
FIG. 1 depicts a cloud computing node according to an embodiment of the present invention.

Embodiments of the invention generally relate to computer systems and more particularly to a hybrid Full Clone and Linked Clone virtual machine deployment scheme to achieve the benefits of Full Clone and Linked Clone virtual machines. A dynamic virtual machine deployment initially is deployed in a Linked Clone state and is therefore quickly deployed. Thus, the dynamically deployed virtual machine is generally ready for immediate use. Meanwhile, while the dynamically deployed virtual machine is actively running, a cloud management system copies segments, functionality, etc. of the master image to the dynamically deployed virtual machine. Eventually, the segments, functionality, etc. are fully instantiated such that the dynamically deployed virtual machine is in a Full Clone state. In certain embodiments, the segments, functionality, etc. are copied as the underlying host system has available resources to do so. For example, if physical memory/disk, physical processing unit, and/or networking resources are used below a certain threshold (e.g., 10% utilization of memory/disk, 20% utilization of processing unit, and/or 15% networking capacity), then the copying of the segments, functionality, etc. may occur in the background. If any of the underlying physical resources changes above a threshold amount, the copying of the segments, functionality, etc. may be paused until the host system returns to a computationally quieter status. Further, the rate of copying of the segments, functionality, etc. can be adjusted inversely compared to the amount of host system physical resources being used for other computational work. For example, as the physical disk usage increases, the copying of segments, functionality, etc. decreases. For clarity, the term virtual machine and the term partition may herein be referred to interchangeably.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
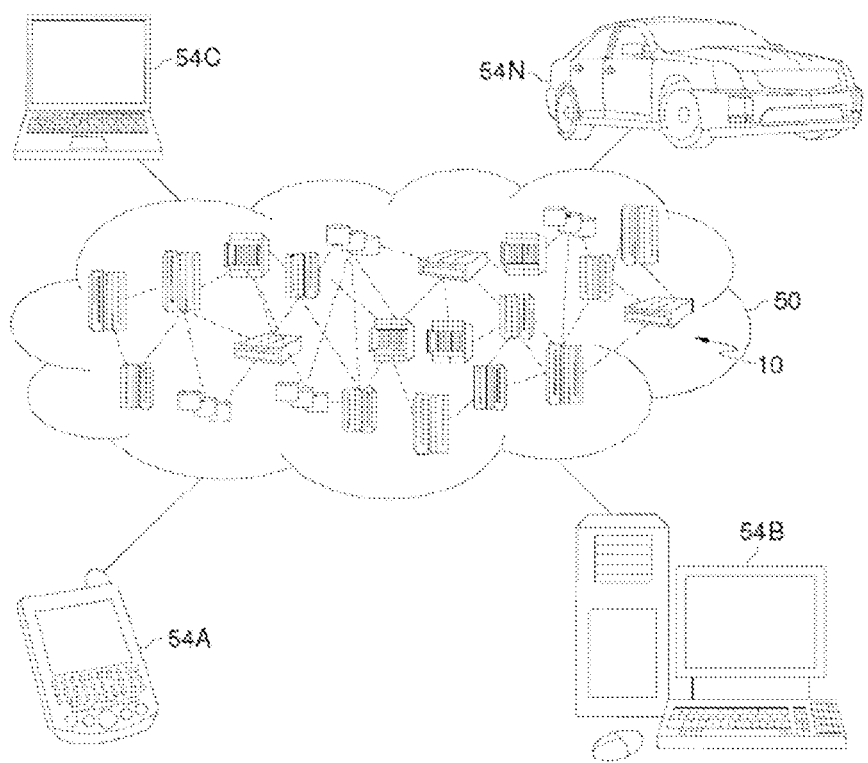
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
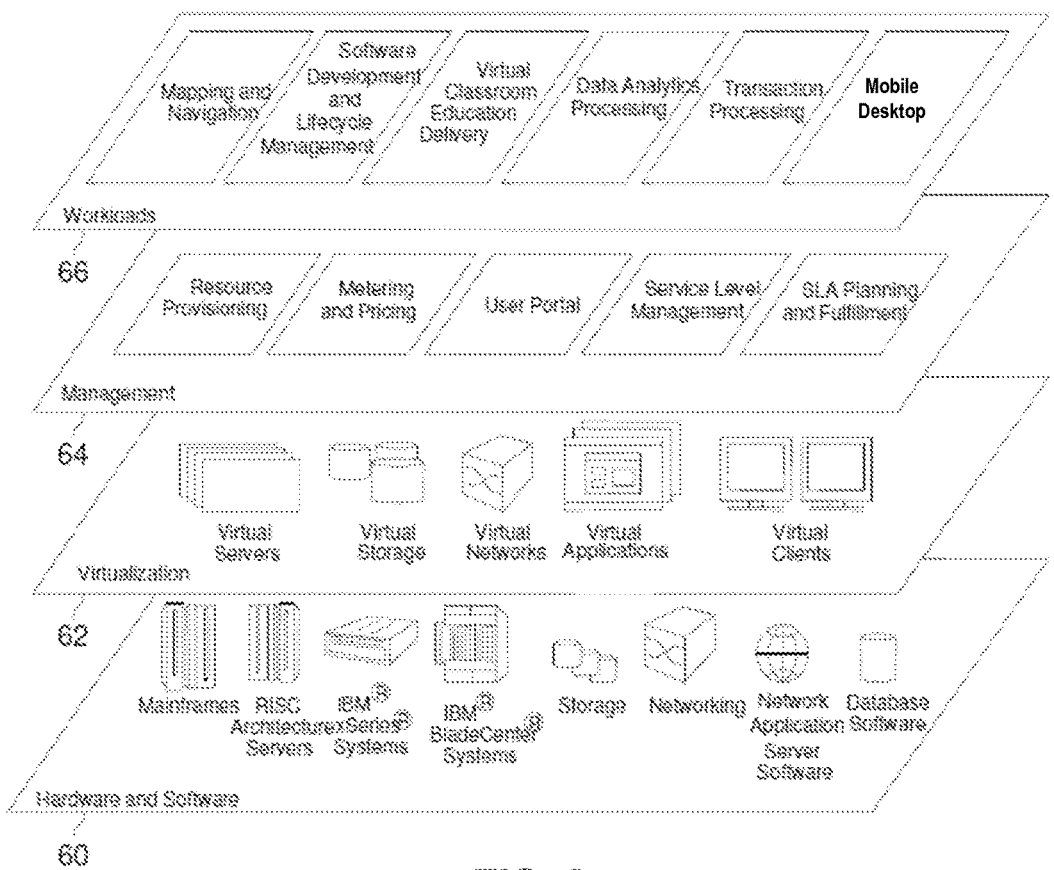
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; mobile desktop.

Figure 4:
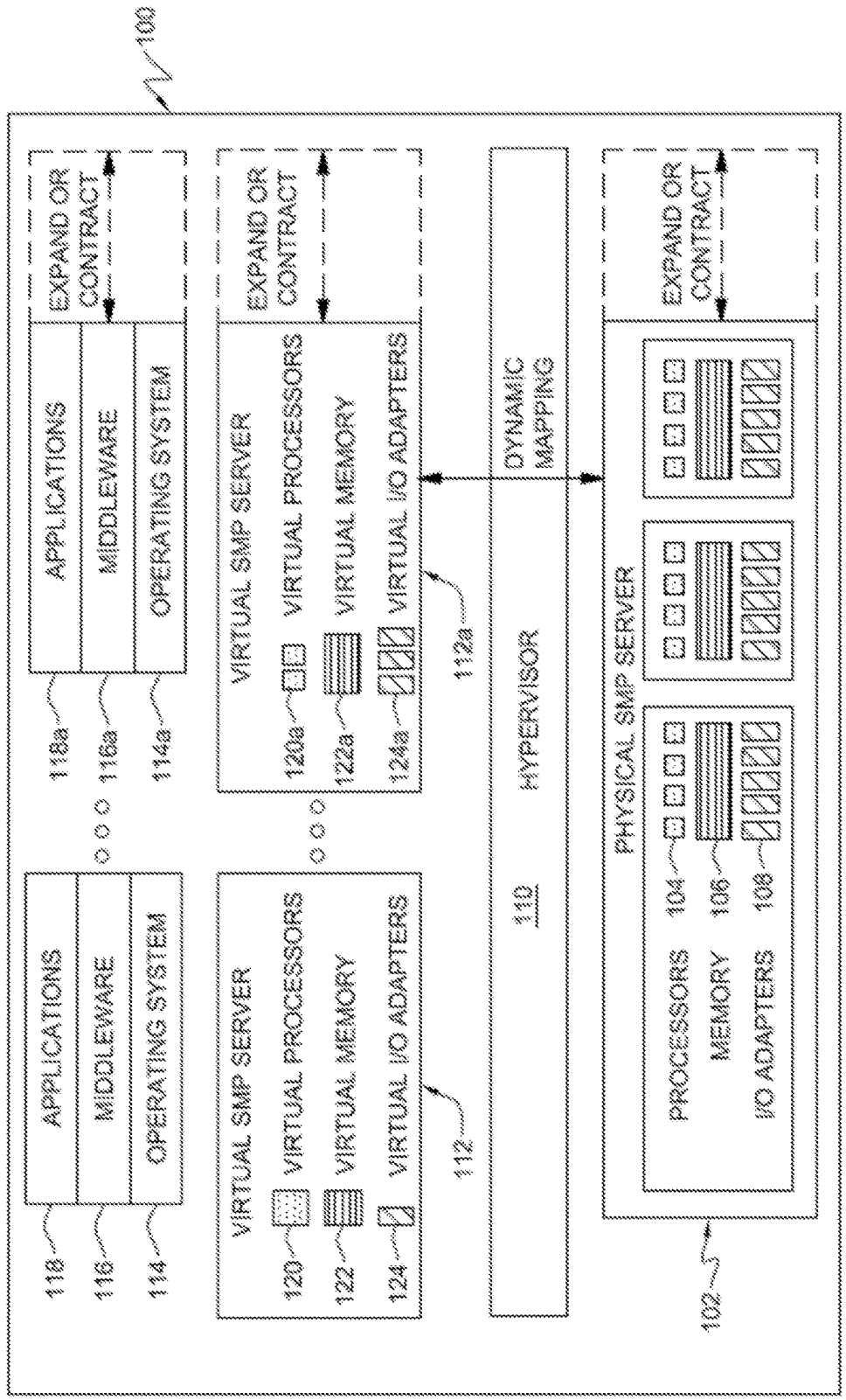
FIG. 4 is a block diagram of an exemplary data processing system to implement one or more embodiments of the present invention.

FIG. 4 is a block diagram of a data processing system 100, which in one example, is a multiprocessing server computer system, computing node 10, etc. System 100 includes physical hardware devices that can be mapped to, i.e., temporarily owned by, a user application to execute that application.

System 100 includes a physical computer system 102. Physical system 102 includes physical hardware devices such as processor 104, memory 106, and I/O adapters 108. These physical devices are managed by hypervisor 110. Processors 104 are shared processors and each may be a simultaneous multithreading capable processor that is capable of concurrently executing multiple different threads on the processor. Hypervisor 110 may also be referred to as a virtual machine manager, virtual machine monitor, managing partition, an operating system 114 within a dedicated virtual machine, etc. For example, the functionality of hypervisor 110 described herein may accomplished by e.g., a managing partition.

A virtual server is a proxy for a physical server that has the same capabilities, interfaces, and state. Virtual servers are created and managed by a hypervisor that resides on physical system 100. A virtual server appears to be a physical server to its user: the operating system, middleware, and application software that run upon it. System 100 includes one or more virtual servers such as virtual server 112.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 5:
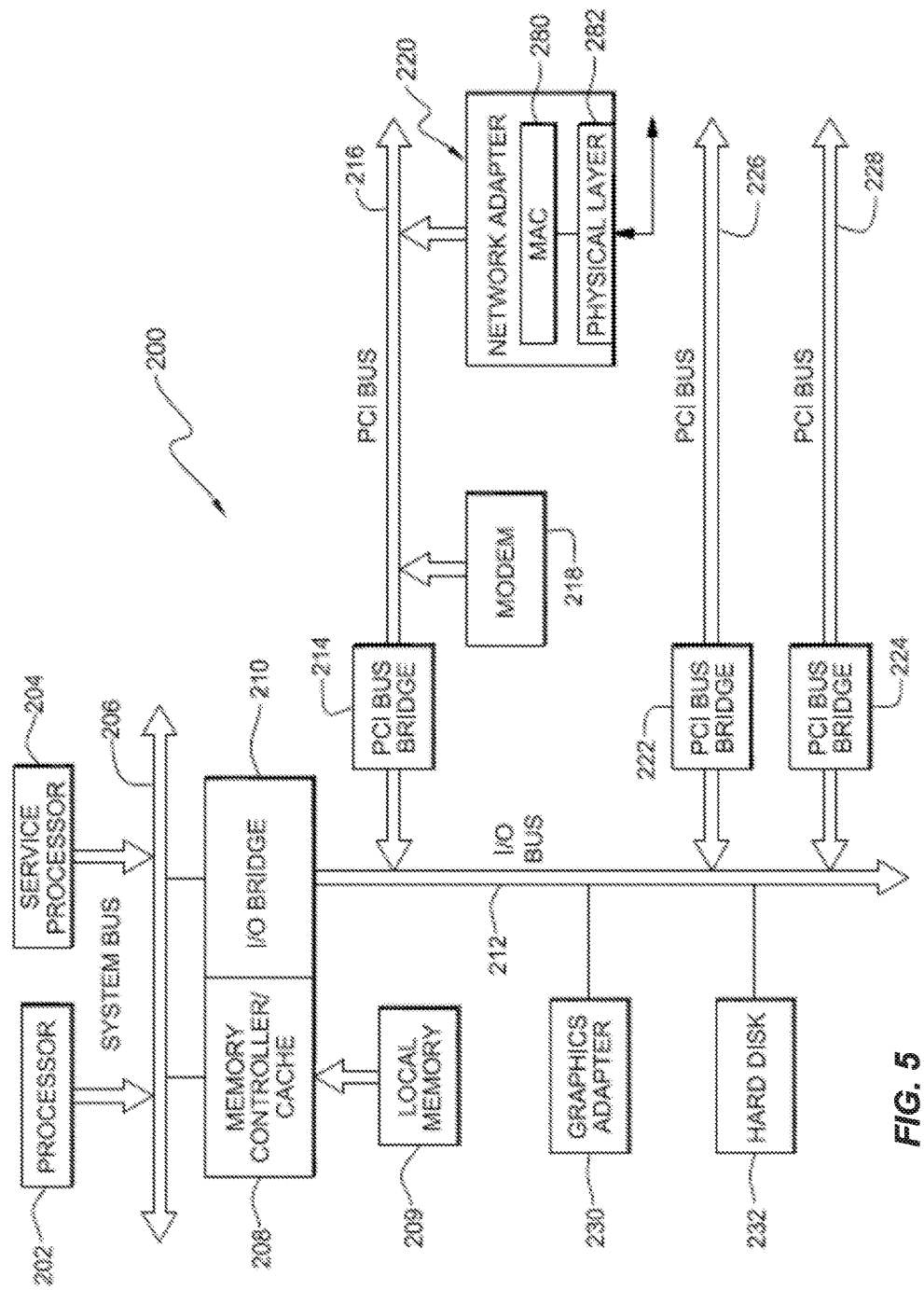
FIG. 5 is a more detailed illustration of a data processing system which could be used to implement one or more embodiments of the present invention.

FIG. 5 is a more detailed illustration of a computer system that may be used to implement the concepts described herein. Data processing system 200 may be a symmetric multiprocessor system including a plurality of shared processors or multi treading capable processors, such as processors 202 and 204 connected to system bus 206. Alternatively, a single processor system may be employed. In the depicted example, processor 204 is a service processor. Each processor may be capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 4, FIG. 5, etc. As a specific, commercially available example, a shared memory partition data processing system implementing hypervisor-managed paging such as described herein below can be built upon technologies found in IBM's p/i Series product line firmware and systemware, as described in the "Power Architecture Platform Reference" (PAPR) material Version 2.7, 9 Oct. 2007, which is hereby incorporated herein by reference. In addition, a virtual input/output server (VIOS) is commercially available as part of a PowerVM™ computing system offered by International Business Machines Corporation™. The VIOS allows sharing of physical resources between logical partitions, including virtual SCSI and virtual networking. This allows more efficient utilization of physical resources through sharing between logical partitions and facilitates server consolidation. For clarity, the shared memory partition is generally a partition or virtual machine sharing memory space (e.g., DRAM memory, FLASH memory, disk drive memory, etc.) with a distinct partition or virtual machine.

Figure 6:
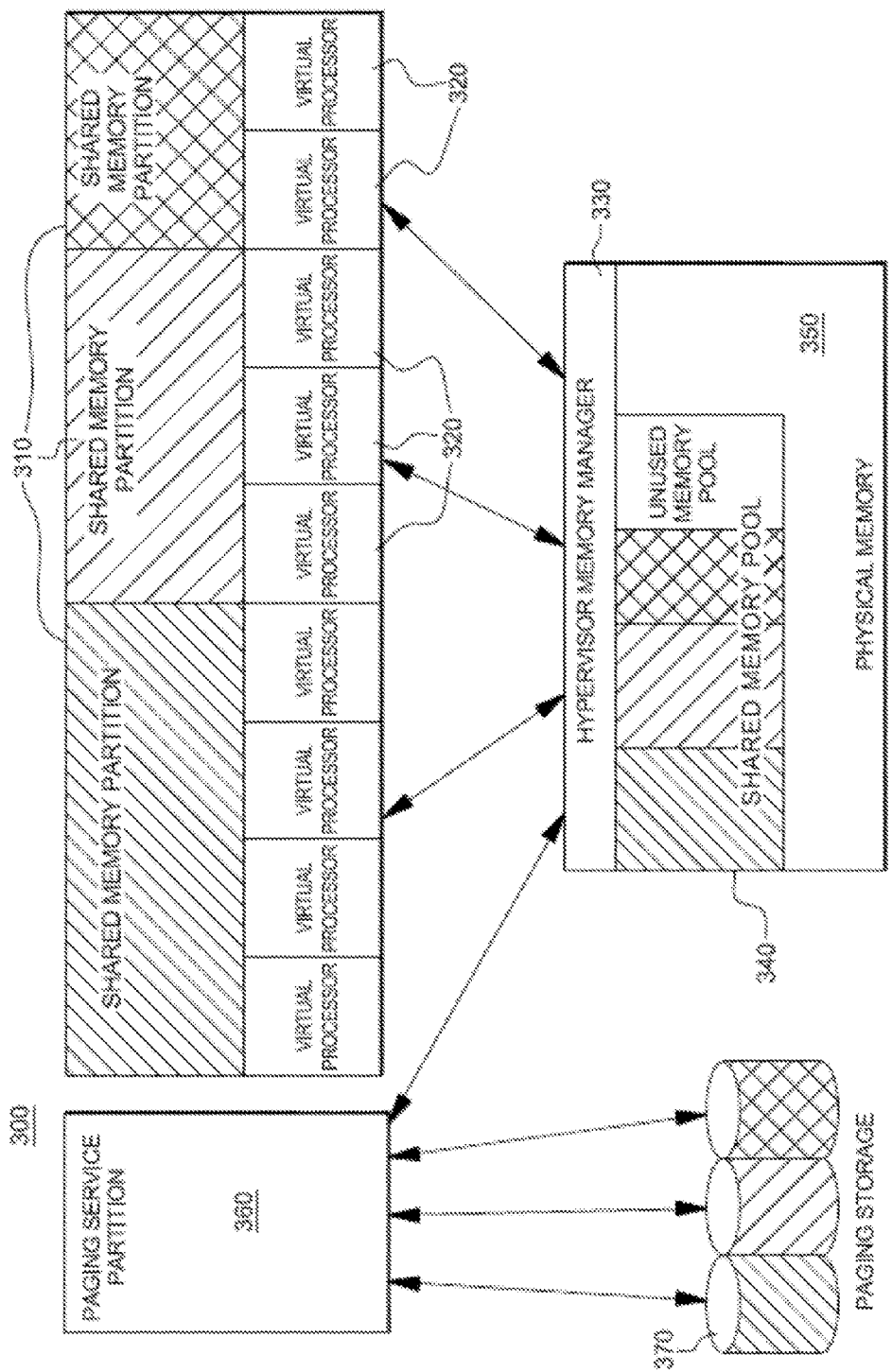
FIG. 6 illustrates an exemplary data processing system including multiple shared memory partitions employing a dynamically adjusting shared (or common) memory pool within physical memory of the data processing system, in accordance with embodiments of the present invention.

As noted, partition computing platforms have presented challenges to fully utilize available resources in the partitioned server. One approach to achieving this goal has been the creation of a shared memory partition data processing system, generally denoted 300, such as depicted in FIG. 6. As illustrated, the shared memory partition data processing system 300 includes one or more shared memory partitions 310, each of which comprises one or more virtual processors 320, which interface through a hypervisor, and more particularly, a hypervisor memory manager 330, to a shared memory pool 340 within physical memory 350 (e.g., cache memory, hard drive memory, etc.) of the shared memory partition data processing system 300. The amount of physical memory in the pool is typically smaller than the sum of the logical memory assigned to all of the shared memory partitions 310 utilizing the shared memory pool to allow the memory to be more fully employed. Logical memory of one or more shared memory partitions may be paged out by the hypervisor to a more abundant, less expensive storage (such as disk storage), via a paging service partition 360. Paging service partition 360 is an enhanced virtual input/output service (VIOS) partition configured to facilitate page-out and page-in of memory pages from or to, respectively, the shared memory pool.

Also, although referred to as a shared memory pool, in reality, there is no sharing of memory per se, but rather a sharing of the availability of a defined amount of physical memory in the pool. This shared memory pool is alternatively characterized as active memory, or virtual real memory. The amount or volume of memory within shared memory pool 340 may be dynamically allocated or adjusted between the shared memory partitions into sub-volumes or sets of physical pages to accommodate workloads. These dynamically allocated adjusted sub-volumes or sets of physical pages in the shared memory pool are associated with the multiple logical partitions and may comprise contiguous or disparate physical memory locations within the shared memory pool. A physical memory page of the shared memory pool becomes part of a sub-volume of a particular logical partition when a logical memory page thereof is associated with or mapped to that physical page. Also, although referred to as a shared memory pool, in reality, there is no concurrent sharing of access to a physical page per se, but rather a sharing of the defined amount of physical memory in the pool. Each shared memory partition with at least one logical memory page mapped to a physical memory page in the pool has an associated sub-volume or set of physical memory of the shared memory pool.

The hypervisor utilizes the shared memory pool in combination with the virtual input/output (VIO) adapter connections to handle paging operations for the shared memory partitions. The hypervisor memory manager manages which physical pages map to which logical memory pages of a given shared memory partition. The management of these pages is transparent to the shared memory partitions and handled fully by the hypervisor. When a logical page is required by a shared memory partition and it does not have a physical mapping in the shared memory pool, the hypervisor treats this request to access as an internal fault (i.e., hypervisor page fault). In response to a hypervisor page fault for a logical memory page that is not resident in the shared memory pool, an input/output (I/O) paging request is allocated by the hypervisor from a pool of free I/O paging requests and sent via the paging service partition to the external page storage of the data processing system to request the needed memory page. The partition's virtual processor encountering the hypervisor page fault is concurrently placed into a wait state, which blocks further execution of that processor until the I/O paging request is satisfied, or if the hypervisor page fault occurred while external interrupts were enabled for the virtual processor, until an external or timer interrupt occurs. The I/O paging request is submitted to the VIO adapter of the paging service partition, which communicates with the paging service partition in order to retrieve and return the correct contents of the logical memory page to fulfill the hypervisor page fault. The same process is also used by the hypervisor memory manager to free up a physical page within the shared memory pool currently mapped to a logical memory page of a shared memory partition, for example, when needed by either that shared memory partition or another shared memory partition.

Figure 7:
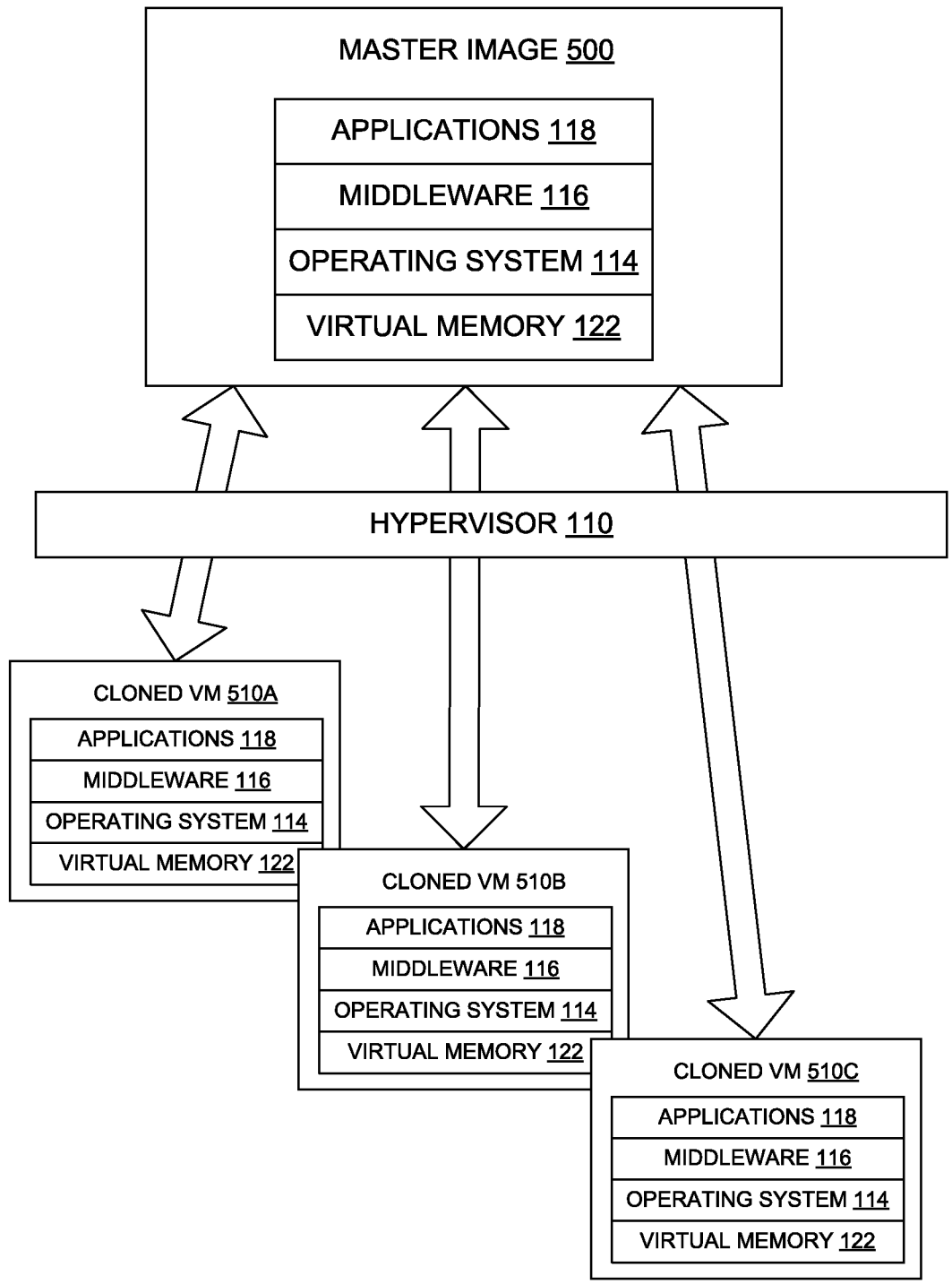
FIG. 7 illustrates exemplary virtual machines or partitions deployed from a master image, in accordance with embodiments of the present invention.

FIG. 7 illustrates exemplary virtual machines 510A, 510B, 510C deployed from master image 500, in accordance with embodiments of the present invention. Generally, virtual machines 510A-510C are clones of an existing master virtual machine. When the cloning operation is complete, virtual machines 510A-510C are generally distinct virtual machines. Changes made to virtual machines 510A-510C do not typically affect the master virtual machine. Further, changes made to the master virtual machine may or may not appear in the cloned virtual machines 510A-510C. Even further, the virtual machines 510A-510C generally include distinct MAC addresses and/or other virtual machine identifiers.

Deploying cloned virtual machines 510A-510C may be useful when numerous identical virtual machines would be beneficial. For example, a cloned virtual machine 510 may be deployed for each employee of an organization wherein each cloned virtual machine 510 includes a suite of preconfigured office applications. Further, the master virtual machine can be configured with a complete development environment and then cloned repeatedly as a baseline configuration for software testing. Even further, an education institution can deploy a cloned virtual machine 510 for each student, with all the lessons and labs required for the term. In other words, by deploying cloned virtual machines 510, one may conveniently make complete copies of the master virtual machine.

Cloned virtual machines 510 may be a Full Clone or a Linked Clone. A Full Clone virtual machine 510 is an independent copy of the master virtual machine that shares nothing with the master virtual machine after the cloning operation. Ongoing operation of the Full Clone virtual machine 510 is entirely separate from the master virtual machine. The Linked Clone virtual machine 510 is a copy of the master virtual machine that shares virtual memory 122 with the master virtual machine in an ongoing manner. This sharing of virtual memory 122 conserves physical memory space, and allows multiple Linked Clone virtual machines 510 to use instances of operating system(s) 114, middleware 166, applications 118, etc.

Full Clone virtual machines 510 are independent virtual machines, with no need to access the master virtual machine. Full Clone virtual machines 510 do not require ongoing connection to the master virtual machine. Because Full Clone virtual machines 510 do not share virtual memory 122 with the master virtual machine, Full Clone virtual machines 510 generally perform better than linked clones. However, Full Clone virtual machines 510 take longer to create than Linked Clones. Since the Full Clone virtual machine 510 is a complete and independent copy of the master virtual machine and duplicates only the state of the master virtual machine at the instant of the cloning operation, the Full Clone virtual machine 510 generally does not have access to any additional master virtual machine images 500 but for the image 500 associated with the state of the master virtual machine at the instant of the cloning operation.

Linked Clone virtual machines 510 are deployed from an image 500 of the master virtual machine. All segments, functionality, etc. available upon the master virtual machine at the moment of the image 500 continue to remain available to the Linked Clone virtual machine 510. Ongoing changes to the virtual memory 122 of the master virtual machine do not affect the Linked Clone, and changes to the virtual memory 122 of the Linked Clone 510 do not affect the master virtual machine. The Linked Clone virtual machine 510 has access to the master virtual machine.

Linked Clone virtual machines 510 are created swiftly, so Linked Clone virtual machines 510 may be deployed for each computational task. For example, a virtual machine may be shared by storing the virtual machine on a local network and a Linked Clone virtual machine 510 may quickly be made from the shared virtual machine. In this manner, for example, a support team could reproduce an error in a virtual machine, and a technician could deploy Linked Clone virtual machine 510 of that virtual machine to investigate the error.

Figure 8:
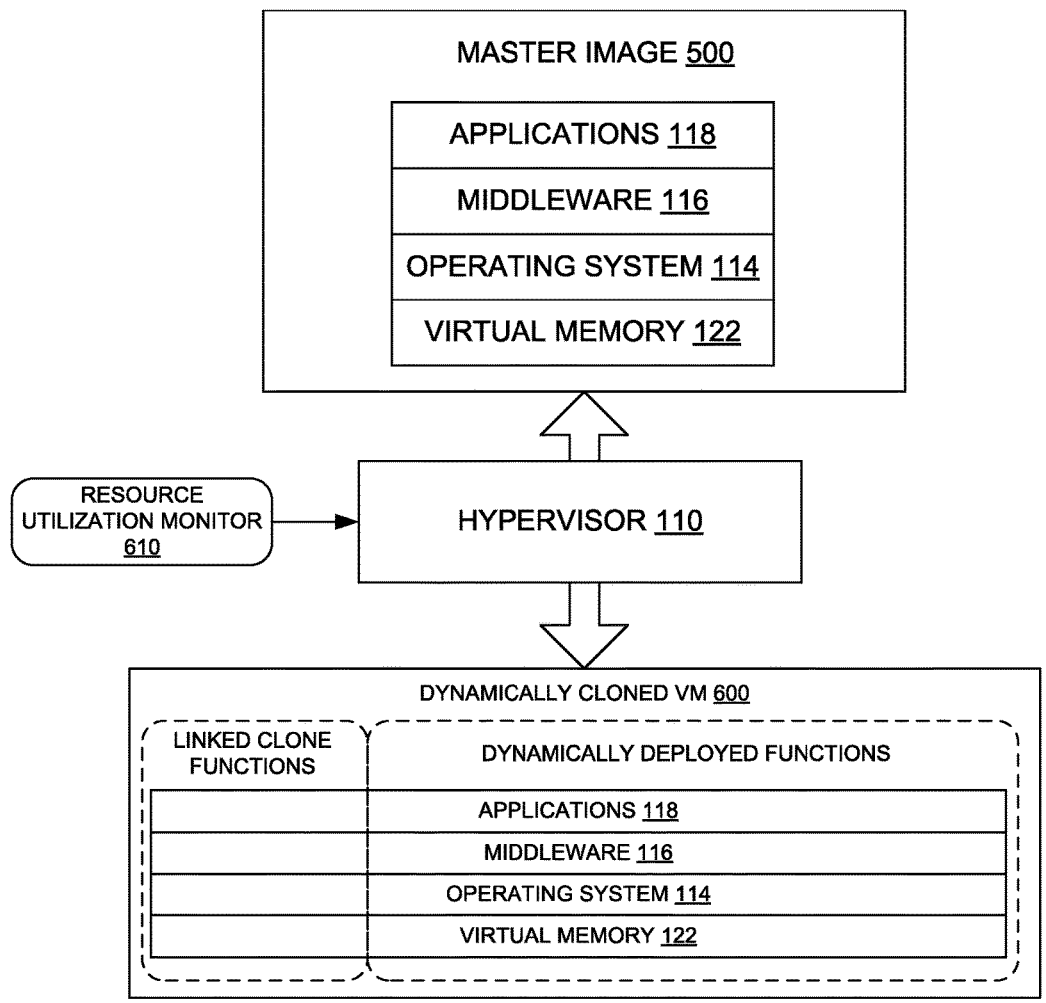
FIG. 8 illustrates exemplary dynamically deployed virtual machines or partitions from a master image, in accordance with embodiments of the present invention.

FIG. 8 illustrates an exemplary dynamically deployed virtual machine 600 from master image 500. Virtual machine 600 is a hybrid Full Clone virtual machine and Linked Clone virtual machine. In certain embodiments, virtual machine 600 is initially deployed as a Linked Clone virtual machine and is therefore quickly deployed. For example, virtual machine 600 is initially deployed in a Linked Clone state having Linked Clone functions, associated Linked Clone virtual memory 122 segments (e.g. portions of virtual memory 122, pages of virtual memory 122, etc.), etc. Virtual machine 600 is therefore available use very shortly after initial deployment.

When virtual machine 600 is active in the initial Linked Clone state, virtual machine 600 includes one or more associated Linked Clone applications 118 and/or middleware 116 (e.g., database management, a web application server such as IBM Websphere, a stream processing application such as IBM InfoSphere, a user application such as a web commerce site or a web banking site. etc.), an complete operating system 114 or a portion of an operating system associated with servicing the deployed Linked Clone applications 118 and/or middleware 116, and/or segments of virtual memory 122.

When virtual machine 600 is actively running, a cloud management system, such as hypervisor 110, begins a dynamic cloning operation and deploys additional virtual memory 122 segments and additional functionality, etc. with respect to and as defined by the master image 500 that was not previously deployed to virtual machine 600 at the initial Linked Clone deployment. Eventually, the virtual memory 122 segments and additional functionality, etc. are fully instantiated to virtual machine 600 such that virtual machine 600 becomes a Full Clone virtual machine. For example, virtual machine 600 becomes a complete and independent copy of the master image 500.

In certain embodiments of the present invention, the dynamic cloning operation occurs as the physical host computing system hosting the virtual machine environment has available physical resources to do so. For example, if memory 106 (i.e. cache memory, disk memory, etc.), processors 104, and/or networking resources are used below applicable thresholds then further deployment of the additional virtual memory 122 segments and additional functionality, etc. continues until virtual machine 600 is Fully Cloned. In certain embodiments, the cloud management system has communicative access to a physical resource monitor 610 that measures the utilization of the physical resources of the physical host computing system. As such, the cloud management system may determine when continued dynamic deployment may occur. If the utilization of the underlying physical resources changes above the applicable threshold, the dynamic deployment of the additional virtual memory 122 segments and additional functionality, etc. may be paused until the physical resources of the host system return to a computationally quieter status. Upon the utilization of the underlying physical resources again falling below the applicable threshold, the dynamic deployment of the additional virtual memory 122 segments and additional functionality, etc. may continue until virtual machine 600 is Fully Cloned.

Figure 9A:
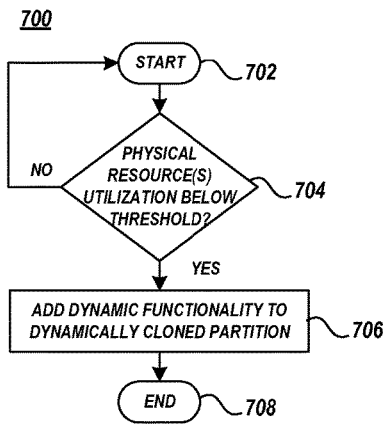
FIG. 9A-FIG. 9F illustrate exemplary deployment schemes of dynamically deployed virtual machines or partitions from a master image, in accordance with embodiments of the present invention.

FIG. 9A illustrates an exemplary deployment method 700 for copying or otherwise deploying dynamically deployed virtual machine 600 from master image 500 or otherwise from a master virtual machine, in accordance with embodiments of the present invention. Method 700 begins at block 702 and continues with hypervisor 110 determining whether physical resources are currently being utilized below a threshold (block 704). For example, the hypervisor 110 may communicative access or otherwise receive resource utilization metrics from resource utilization monitor 610 of underlying physical resources (e.g., processor(s) 104, memory or memories 106, etc.) of a physical computing system (e.g., system 102) hosting or otherwise implementing the dynamically deployed virtual machine 600. In certain embodiments, because the master image 500 and the dynamically cloned virtual machine 600 may be implemented by distinct physical computing systems, the resource utilization monitor 610 may also determine network utilization of a network that communicatively connects the physical computing system hosting or otherwise implementing the dynamically deployed virtual machine 600 and the computing system hosting or otherwise implementing the master virtual machine or otherwise storing the master image 500. If hypervisor 110 determines that at least one applicable physical resource is currently being utilized below a threshold, hypervisor 100 copies or otherwise deploys dynamically deployed virtual machine 600 from master image 500, from a master virtual machine, etc. In certain embodiments, all applicable physical resource must be utilized below the applicable threshold before hypervisor 100 copies or otherwise deploys dynamically deployed virtual machine 600. For example, hypervisor 100 may deploy dynamically deployed virtual machine 600 if memory 106 is being utilized at a 10% utilization level or less, if processor 104 is being utilized at a 20% utilization level or less, and if the commutations network is being utilized at a 15% utilization level or less. Method 700 ends at block 708.

Figure 9B:
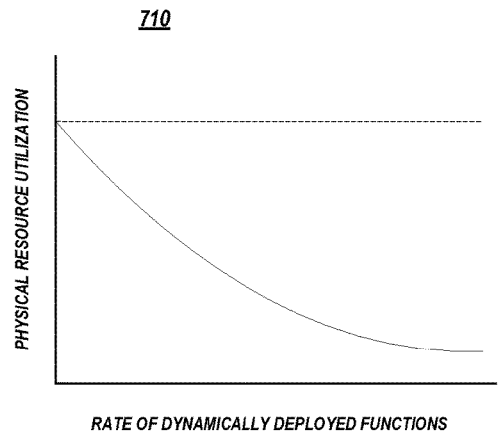

FIG. 9B illustrates an exemplary deployment scheme 710 for dynamically deploying virtual machine 600, in accordance with embodiments of the present invention. The rate of deploying segments of added virtual memory 122, added functionality, etc. can be adjusted inversely relative to the utilization of the physical resources of the physical computing system hosting or otherwise implementing the dynamically deployed virtual machine 600. For example, as the physical disk memory usage increases, the copying of virtual disk memory segments decreases.

Figure 9C:
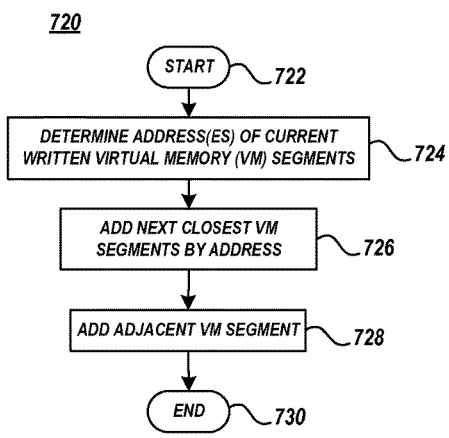

FIG. 9C illustrates an exemplary deployment method 720 for copying or otherwise deploying dynamically deployed virtual machine 600 from master image 500 or otherwise from a master virtual machine, in accordance with embodiments of the present invention. Method 720 may be utilized to reference the addresses of currently copied virtual memory 122 segments within virtual machine 600 and sequentially copy adjacent virtual memory 122 segments that are not currently deployed to virtual machine 600 into virtual machine 600. Method 720 begins at block 722 and may continue with hypervisor 110 determining one or more addresses of one or more currently written virtual memory 122 segments (block 724). For example, hypervisor 110 determines the various addresses of the virtual memory 122 segments deployed to virtual machine 600 associated with its initial Linked Clone state. Method 720 may continue by hypervisor 110 copying or otherwise deploying those virtual memory 122 segments as defined or otherwise included within master image 500 that have or are associated with next closest addresses relative to those addresses currently deployed to virtual machine 600 (block 726). Method 720 may continue such that adjacent (next closest, etc.) virtual memory 122 segments being copied or otherwise deployed to virtual machine 600 (block 728). For example, consecutive virtual memory 122 segments are serially deployed to virtual machine 600 until virtual machine 600 is a Linked Clone virtual machine. Method 720 ends at block 730.

Figure 9D:
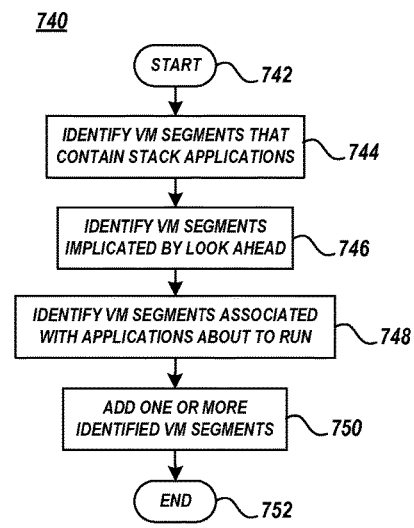

FIG. 9D illustrates an exemplary deployment method 740 for copying or otherwise deploying dynamically deployed virtual machine 600 from master image 500 or otherwise from a master virtual machine, in accordance with embodiments of the present invention. Method 740 may be utilized to copy or deploy those memory 122 segments into virtual machine 600 associated with one or more applications 118 currently deployed to virtual machine 600. Method 740 begins at block 742 and may continue with hypervisor 110 identifying virtual memory 122 segments within the master image 500 that contain application data (block 744). For example, virtual memory 122 within master image 500 associated with a stack application 118 may be identified.

Method 740 may continue with hypervisor 110 determine those virtual memory 122 segments that are about to be accessed by an active application 118 within virtual machine 600. For example, using look ahead scripts the hypervisor 110 may identify virtual memory 122 segments within master image 500 that should be deployed as they are about to be accessed by an active application 118 within the virtual machine 600. Method 740 may continue with hypervisor 110 determining those virtual memory 122 segments associated with an application 118 that is about to run within virtual machine 600 (block 748). Method 740 may continue with hypervisor 110 copying or otherwise deploying the virtual memory 122 segments identified by blocks 744, 746, and/or 748 from master image 500 to virtual machine 600 (block 750). Method 740 ends at block 752.

Figure 9E:
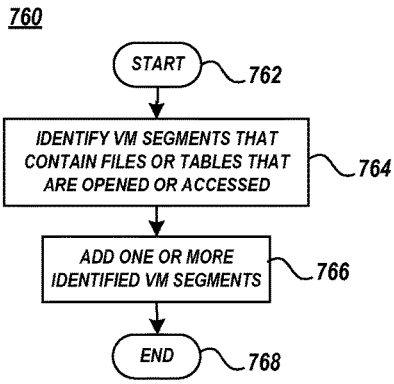

FIG. 9E illustrates an exemplary deployment method 760 for copying or otherwise deploying dynamically deployed virtual machine 600 from master image 500 or otherwise from a master virtual machine, in accordance with embodiments of the present invention. Method 760 may be utilized to copy or deploy those memory 122 segments into virtual machine 600 that have stored at least a portion of a file or table associated with an application (e.g., database application 118, database middleware 116, etc.) that is opened or otherwise accessed within virtual machine 600. Method 760 begins at block 762 and continues with hypervisor 110 identify virtual memory 122 segments within master image 500 that have data stored thereupon and are associated with an open or otherwise accessed file or table within virtual machine 600 (block 764). For example, identifies writable virtual memory 122 segments within master image 500 associated with an active database application within virtual machine 600. Method 760 may continue with hypervisor 110 copying or otherwise deploying the identified virtual memory 122 segments from master image 500 to virtual machine 600.

Figure 9F:
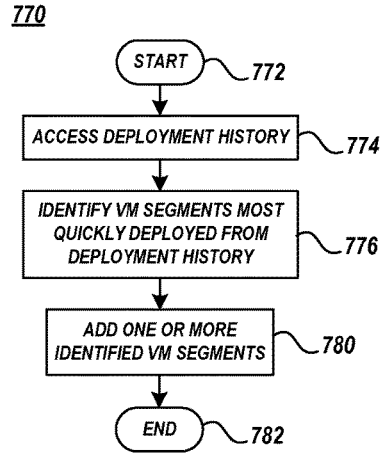

FIG. 9F illustrates an exemplary deployment method 770 for copying or otherwise deploying dynamically deployed virtual machine 600 from master image 500 or otherwise from a master virtual machine, in accordance with embodiments of the present invention. Method 770 may be utilized to deploy virtual memory 122 segments and/or functionally from master image 500 to virtual machine 600 in an order determined from virtual machine deployment history. For example hypervisor 110 may be tasked with deploying hundreds or more dynamically deployed virtual machines 600. Over time an order of the deployment of virtual memory 122 segments and/or functionally from master image 500 to the numerous virtual machines 600 may be recognized. For example, it may be determined that twenty virtual memory 122 pages are similarly copied first to each of the numerous virtual machines 600. Therefore, in a subsequent virtual machine 600 deployment, hypervisor 110 may deploy those additional twenty virtual memory 122 pages.

Method begins at block 772 and may continue with hypervisor 100 accessing a history file that tracks the deployment history of numerous dynamically deployed virtual machines 600 (block 774). In certain embodiments, hypervisor 110 may maintain various history files each associated with a different master image. In various embodiments, the history file may track the first "n" virtual memory 122 segments copied from the associated master image 500 to various instances of virtual machine 600.

Method 772 may continue with hypervisor determining a deployment pattern from the history file to determine the virtual memory 122 segments of master image 500 that were most frequently deployed initially to the various instances of virtual machine 600 (block 776). For example, it may be determined that virtual memory 122 segments storing a particular library application are historically deployed within the first one hundred virtual memory 122 segment copies to the various instances of virtual machine 600. Method 772 may continue hypervisor 110 copying or otherwise deploying the identified virtual memory 122 segments from master image 500 to virtual machine 600 (block 780). Method 772 ends at block 782.

In certain embodiments, at the time of creating master image 500, a image creation parameter may be associated with the created master image 500 indicating that the master image 500 is to be utilized as a Full Clone master image (e.g., only Full Clone virtual machines may be deployed from the Full Clone master image, etc.), a Linked Clone master image (e.g., only Linked Clone virtual machines may be deployed from the Linked Clone master image, etc.), and/or a Dynamically Deployed master image (e.g., only Dynamically Deployed virtual machines may be deployed from the Dynamically Deployed master image, etc.). In such embodiments, a clone creation parameter may be associated with a cloned virtual machine from the Full Clone master image, Linked Clone master image, or Dynamically Deployed master image. Such clone creation parameter may indicate that the deployed virtual machine should be a Linked Clone virtual machine, Full Clone virtual machine, or a Dynamically Deployed virtual machine. In some embodiments, the clone creation parameter may override the image creation parameter. For example, a clone creation parameter may indicate that a particular virtual machine be deployed as a Dynamically Deployed virtual machine 600 from a particular image associated with an image parameter that only Linked Clone virtual machines shall be deployed therefore. Because the clone creation parameter overrides the image creation parameter, the deployed virtual machine will be deployed as a Dynamically Deployed virtual machine 600. In some embodiments, if the creation parameter is defaulted, the management system determines the clone creation mode. For example, the management system may determine that virtual machine instances should be deployed as the hybrid virtual machine 600.

Figure 10:
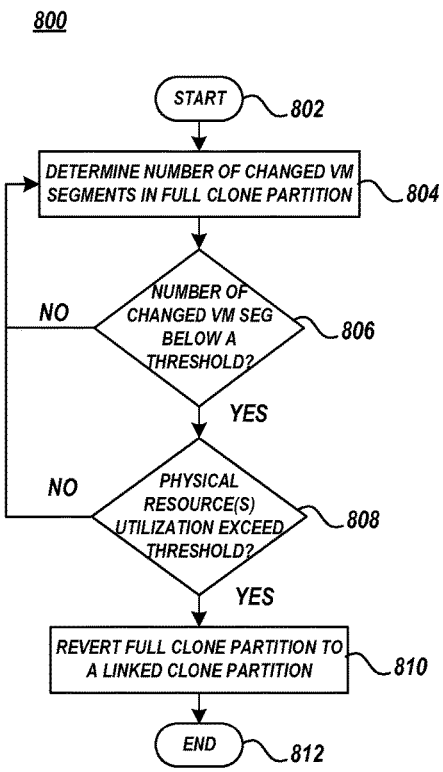
FIG. 10 illustrates an exemplary reversion of a dynamically deployed virtual machine or partition in Full Clone state to a Linked Clone state, in accordance with embodiments of the present invention.

FIG. 10 illustrates an exemplary reversion method 800 of dynamically deployed virtual machine 600 in a Full Cloned state reverting to the Dynamic Deployment state, in accordance with embodiments of the present invention. In certain embodiments, process 800 may be utilized when virtual machine 600 is in a Full Clone state and running as an independent virtual machine. If the physical resources of the computing system hosting or otherwise implementing the dynamically deployed virtual machine 600 become stressed or over utilized, the virtual machine 600 may de-allocate virtual memory 122 segments and revert to a dynamic deployment state. For example, if the physical resources are utilized above an upper utilization threshold, the virtual machine 600 may de-allocate virtual memory 122 segments or other functionality. The de-allocated virtual memory 122 segments may be re-deployed to virtual machine 600 upon the physical resources returning to a non-stressed computational status. For example, the de-allocated virtual memory 122 segments may be re-deployed to virtual machine upon the physical resources being utilized below the upper utilization threshold, below the utilization threshold as described in FIG. 9A, etc.

Method 800 begins at block 802 and continues with hypervisor 110 determine the number of virtual memory 122 segments that have changed relative to the virtual memory 122 segments of master image 500 (block 804). For example, if virtual machine 600 writes to a virtual memory 122 segment allocated to virtual machine 600, the written-to virtual memory 122 segment would have changed relative to the associated virtual memory 122 segment of the master image 500. Method 800 may continue by hypervisor determining whether the number of virtual memory 122 segments that have changed relative to the virtual memory 122 segments of master image 500 is below a threshold (block 806). For instance, an newly deployed virtual machine 600 will have less changed virtual memory 122 segments than a relatively older virtual machine 600.

If the number of virtual memory 122 segments that have changed relative to the virtual memory 122 segments of master image 500 is below a threshold, hypervisor 110 determines whether the physical resources of the computing system hosting or otherwise implementing the dynamically deployed virtual machine 600 are operating above an upper resource utilization threshold (block 808). For example, hypervisor 100 determines that the processor is operating above an 80% utilization level, etc. Method 800 continues by deallocating virtual memory 122 segments (e.g., unchanged virtual memory 122 segments, virtual memory 122 segments that are most likely to be unutilized by virtual machine 600, etc.) if the physical resources of the computing system hosting or otherwise implementing the dynamically deployed virtual machine 600 are operating above an upper resource utilization threshold (block 810). By deallocating one or more virtual memory 122 segments, the virtual machine 600 reverts from a Full Clone state back to a Dynamic Deployment state wherein the deallocated virtual memory 122 segments may be again deployed to virtual machine 600. Method 800 ends at block 812.

Figure 11:
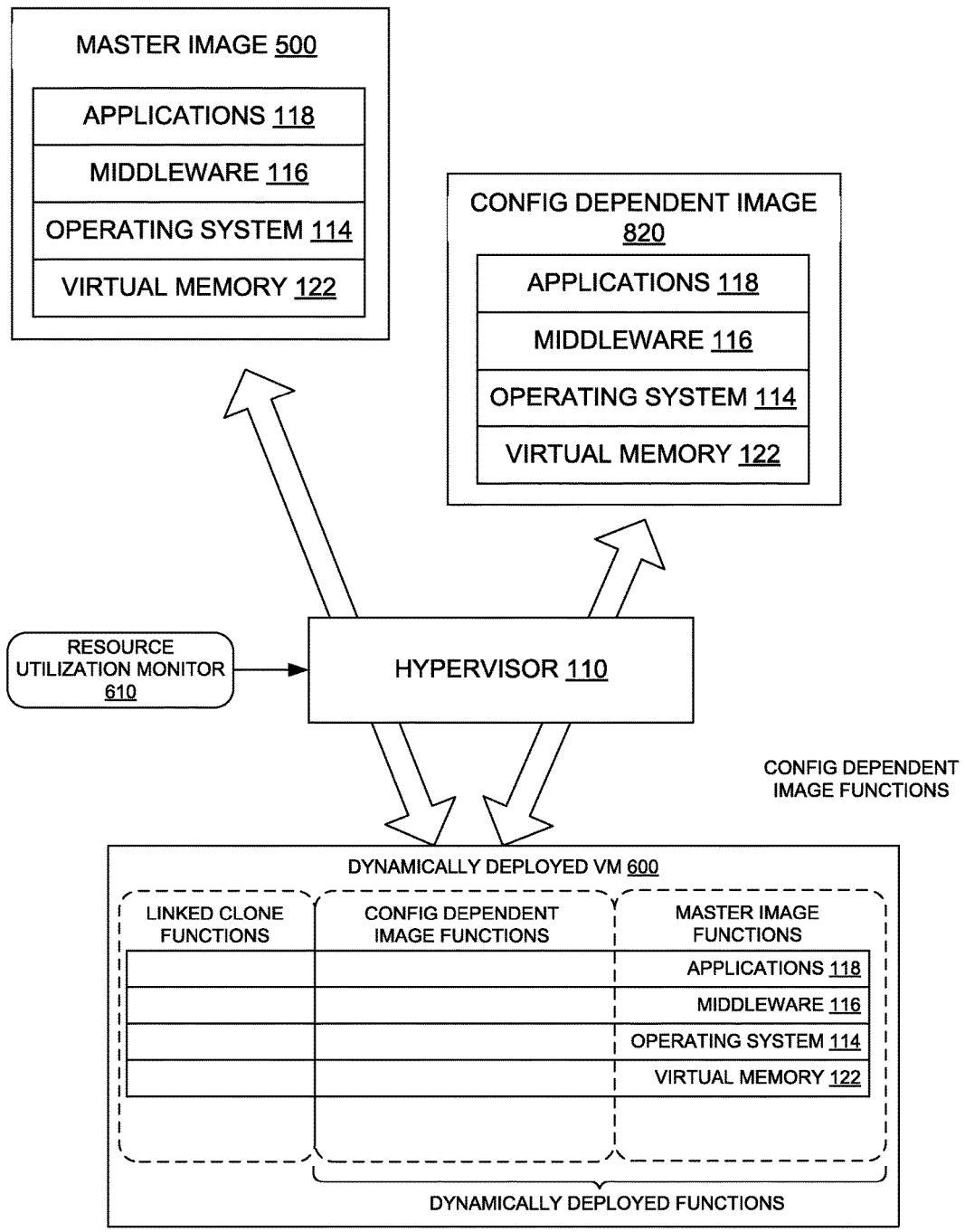
FIG. 11 illustrates exemplary dynamically deployed virtual machines or partitions from a master image and a configuration dependent master image, in accordance with embodiments of the present invention.

FIG. 11 illustrates exemplary dynamically deployed virtual machine 600 from master image 500 and a configuration dependent image 820. In certain embodiments, multiple images are cached upon a physical computer system (e.g., a compute node within a communications network, etc.). Such images may be associated with e.g., a Full Clone creation parameter, a Linked Clone creation parameter, etc. In certain implementations a virtual machine may be deployed in association with multiple images. For example, the dynamically deployed virtual machine 600 may be deployed from the master image 500 and from a second configurations dependent image 820. In this type of implementation the master image 500 may be relatively smaller with a majority of the functionality of the deployed clone being associated with the configuration specific image, etc. In a resulting embodiment, the dynamically deployed virtual machine 600 may be deployed initially as a Linked Clone from master image 500, subsequently being dynamically deployed from master image 500, and subsequently being further dynamically deployed from configuration dependent image 820. In another resulting embodiment, the dynamically deployed virtual machine 600 may be deployed initially as a Full Clone from master image 500 and subsequently being dynamically deployed from configuration dependent image 820.

Figure 12:
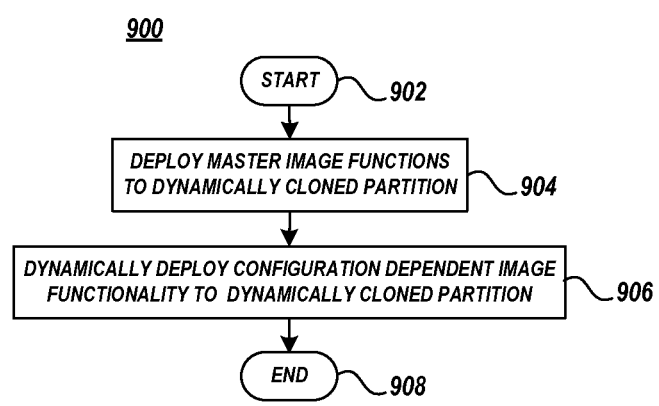
FIG. 12 illustrates an exemplary deployment scheme of dynamically deployed virtual machines or partitions from a master image and a configuration dependent master image, in accordance with embodiments of the present invention.

FIG. 12 illustrates an exemplary method 900 for deploying dynamically deployed virtual machine 600 from master image 500 and configuration dependent image 820. Method 900 may be utilized when the dynamically deployed virtual machine 600 is deployed in association with multiple images. Method 900 beings at block 902 and continues with deploying virtual memory 122 segments, functionality, etc. from master image 500 (block 904). For example, virtual machine 600 may be initially deployed as a Linked Clone from master image 500 and subsequently being further dynamically deployed from master image 500. Alternatively, virtual machine 600 may be initially deployed as a Full Clone from master image 500. Method 900 may continue with dynamically deploying virtual memory 122 segments, functionality, etc. from configuration dependent image 820 (block 906). For example, virtual memory 122 segments may be deployed to virtual machine 600 from configuration dependent image 820 according to method 700, etc.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A virtual machine dynamic deployment method comprising:
    implementing a hypervisor within a data handling system comprising plurality of physical computing resources, the physical computing resources including at least a processor and a memory;
    initially deploying, with the hypervisor, a dynamically deployed virtual machine as a Linked Clone of a master image;
    dynamically deploying, with the hypervisor, the dynamically deployed virtual machine by copying a plurality of virtual memory segments from the master image until the dynamically deployed virtual machine is an independent Full Clone of the master image;
    wherein copying the plurality of virtual memory segments from the master image until the dynamically deployed virtual machine is an independent Full Clone of the master images comprises:
        copying initial virtual memory segments from the master image into the dynamically deployed virtual machine;
        starting an actively running application within the dynamically deployed virtual machine utilizing only the initial virtual memory segments within the dynamically deployed virtual machine;
        identifying additional virtual memory segments within the master image that are implicated by look ahead functions of the actively running application within the dynamically deployed virtual machine that indicate the additional virtual memory segments are being accessed by the actively running application, wherein the actively running application has increased functionality upon accessing the additional virtual memory segments relative to the functionality of the actively running application upon accessing only the initial virtual memory segments; and
        copy, with the hypervisor, the implicated virtual memory segments from the master image to the dynamically deployed virtual machine.

2. The virtual machine dynamic deployment method of claim 1, wherein the hypervisor copies the plurality of virtual memory segments from the master image if at least one of the physical computing resources is operating below a utilization threshold.

3. The virtual machine dynamic deployment method of claim 2, wherein a rate that the hypervisor copies the plurality of virtual memory segments from the master image is proportional to an extent of at least one of the physical computing resources operating below the utilization threshold.

4. The virtual machine dynamic deployment method of claim 1, further comprising:
    determining, with the hypervisor, an address of a currently deployed virtual memory segment within the dynamically deployed virtual machine;
    determining, with the hypervisor, an associated virtual memory segment within the master image, and;
    copying, with the hypervisor, adjacent virtual memory segments from the master image to the dynamically deployed virtual machine.

5. The virtual machine dynamic deployment method of claim 1, further comprising:
    determining, with the hypervisor, virtual memory segments within the master image that will be implicated by an application that is about run within the dynamically deployed virtual machine, and:
    copying, with the hypervisor, the implicated virtual memory segments from the master image to the dynamically deployed virtual machine.

6. The virtual machine dynamic deployment method of claim 1, further comprising:
    determining, with the hypervisor, virtual memory segments within the master image that are implicated with an actively utilized database table within the dynamically deployed virtual machine, and;

copying, with the hypervisor, the implicated virtual memory segments from the master image to the dynamically deployed virtual machine.

7. The virtual machine dynamic deployment method of claim 1, further comprising:

copying, with the hypervisor, virtual memory segments from the master image to the dynamically deployed virtual machine identified by a virtual memory segment deployment history file.

\* \* \* \* \*